Dec. 1, 1925.
M. A. WEST
GUY LINE GRIP
Filed Jan. 3, 1925
1,563,603
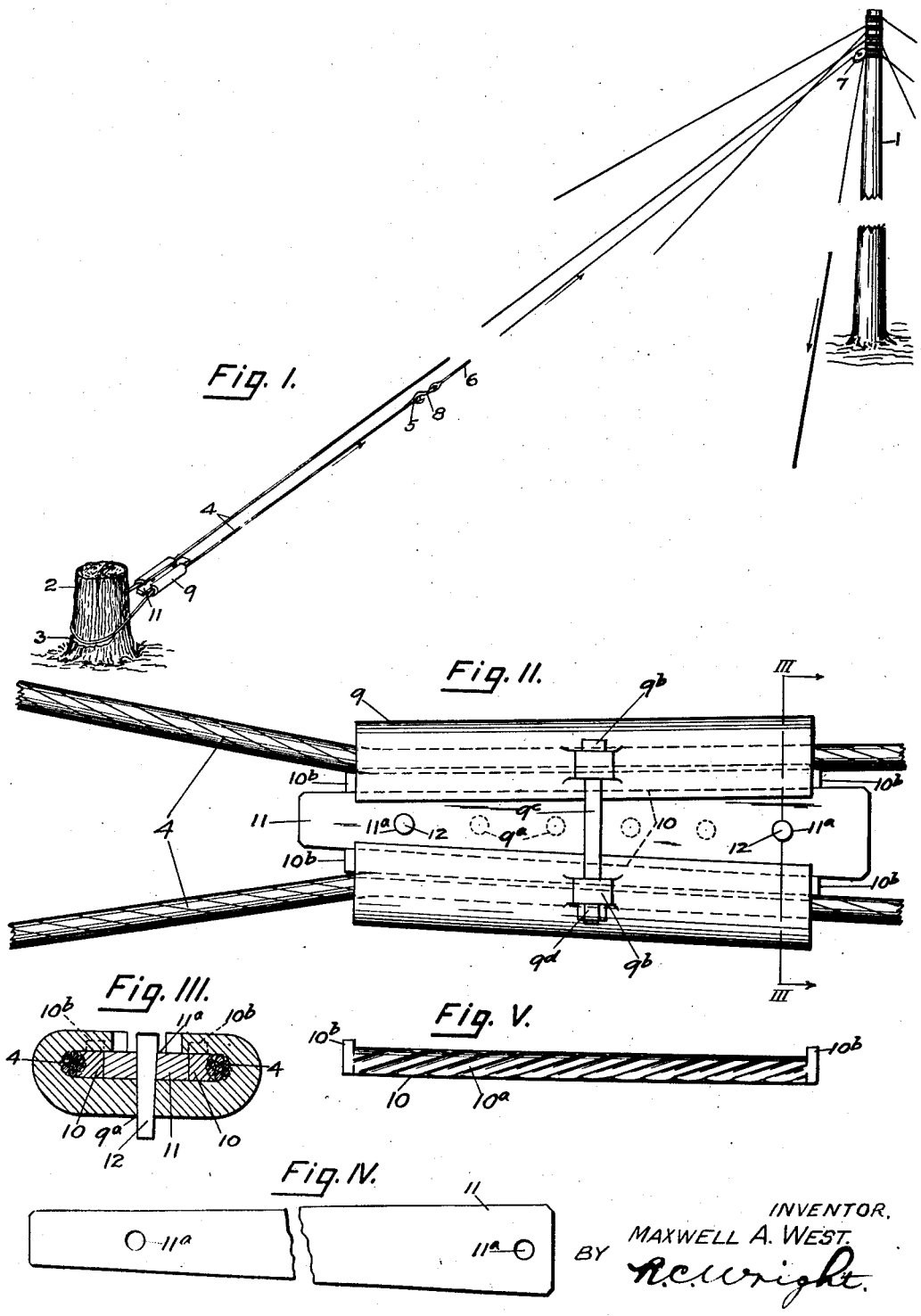
INVENTOR.
MAXWELL A. WEST.
BY R.C. Wright
ATTORNEY.

Patented Dec. 1, 1925.

1,563,603

UNITED STATES PATENT OFFICE.

MAXWELL A. WEST, OF PORTLAND, OREGON.

GUY-LINE GRIP.

Application filed January 3, 1925. Serial No. 340.

*To all whom it may concern:*

Be it known that I, MAXWELL A. WEST, a citizen of the United States, residing at Portland, in the county of Multnomah and State of Oregon, have invented a new and useful Improvement in Guy-Line Grips, of which the following is a specification, reference being had to the accompanying drawings.

My invention relates to guy line clamps as a class.

The object of my invention is to provide a device of this class wherein there is a gripping member adapted to be adjusted upon oppositely disposed parts of a guy line, combined with plates and a wedge therein to secure the guy line parts in rigid position within the device. These objects, as well as other advantages, I attain by the construction, combination and arrangement of parts illustrated in the accompanying drawings which form a part hereof.

Fig. I is a perspective view of a spar-tree, a guy stump, a guy line, and the device in operative position upon the line.

Fig. II is a top plan view of parts of a guy line with the device in operative position thereon.

Fig. III is a sectional view on the line III—III in Fig. II.

Fig. IV is a top plan view of the wedge, partly broken in the center.

Fig. V is a front elevation of a clutch plate, showing helical grooving.

Like characters refer to like parts in all views.

In Fig. I is shown a spar-tree 1, a guy stump 2, with a groove 3 therein in its farther side from the spar-tree, a guy line 4, having one end rigidly secured to the spar-tree near its top and extending therefrom about the stump in its groove 3 to an eye 5 in its free end, a tightening cable 6, extending from any convenient means for drawing and slackening the same, such as a drum rotated by a donkey engine, through a pulley 7, secured to and near the top of the spar-tree, to a hook 8 in its free end, adapted to engage the eye 5 of the line 4. Upon the line 4 the device is shown in operative position. The line 4 is of the common type of cable composed of wire strands twisted longitudinally, with a helical outer surface.

The gripping device is composed of a grip member 9, clutch plates 10, a locking wedge 11 and wedge pin 12. The gripping member 9 is in the form of a metal sheet folded, with longitudinal edges a convenient distance apart, and tapering spaces within the folded parts adapted to receive a guy cable of common type on each side. There is also a helical surface on a portion of the interior part of this member. This surface may also be made smooth if preferred, in one or both sides of the member. The member 9 also has a series of openings $9^a$ aligned along its central portion and spaced a convenient distance apart from each other. On the upper surface of each folded side of the member 9 are lug eyes $9^b$, through which extends a reinforcing bolt $9^c$, having a head on one end and is threaded on its opposing end. It is secured in position by a nut $9^d$, which engages the opposing lug eye. The clutch plate 10 has plane upper and lower surfaces and on one side surface. The fourth side surface has a helical groove $10^a$, adapted to receive the line 4 in engagement therewith. The plate also has a lug $10^b$ on each end projecting at an angle thereto. The wedge 11 is of tapering form and of a thickness adapting it to be inserted within the member 9 with its edges engaging opposing edges of the plates 10 when positioned in said member. In the wedge is an opening $11^a$. There may be one or more of these openings and they are positioned to register with one or more of the openings $9^a$ of the member 9. The openings $9^a$ and $11^a$, when in registry, are adapted to receive the pin 12 through them and prevent the wedge from moving out of a position to which it is set.

In logging operations the custom is to select a suitable spar-tree in convenient location. It is necessary to secure this spar-tree in a rigid vertical position, which is done by means of a series of guy lines extending from its top in different directions. A pulley is secured near its top, through which a very heavy cable extends from the reeling drum of a donkey engine to a log which is to be hauled from the place where felled to a skid-way, a carrier or other place from which the log is to be further disposed of. In these operations it is necessary to frequently change spar-trees. In doing so, all equipment on the tree must be removed and again set up on another tree. Heretofore the guy lines have been drawn about the guy stump and secured after each pull by wrapping and fastening with heavy spikes. While this is going on a number of men who attend to the hauling of the logs are idle. My device is to enable operators to secure the guy lines rigidly and with far greater speed, thus reducing the cost of logging operations mentioned.

The operation of the device will now be described. The guy line 4 is rigidly secured at one end near the top of the spar-tree. The free end is then brought around the guy stump and the line placed in the groove therein, forming a loop about the stump. The parts of the line near the throat of the loop are slipped into the folded parts of the member 9 in opposing position as shown. The plates 10 are then laid alongside each line surface with their helical edges engaging the line and their lugs $10^b$ engaging the ends of the member 9. The drawing cable 6 may now be hooked to the eye in the free end of the line 4. The wedge 11 is to be inserted loosely to allow the line to be drawn. The wedge may be kept from jumping out by inserting the pin 12 through any registered openings in the wedge and member 9. The reinforcing bolt $9^c$ is placed in position in the lug eyes $9^b$ and retained there by the nut $9^d$. The object of this bolt is to allow the member 9 to be made of lighter material, to prevent its folds from spreading and releasing the clutch on the line, and is attained by means of the bolt as a supplementing reinforcement in the manner illustrated. When the device and lines are assembled as stated, the drawing cable is operated to draw the line 4 to the desired tautness to function as a guy line along that direction. When this is done, the pin, if in the wedge, is removed. The wedge, when free of the pin is driven into the member 9 until it forces the plates 10 against the line 4 sufficiently to cause it to be gripped rigidly between the plates and opposing surfaces of the member 9 and prevent it from slipping through. The pin is then inserted as before in registering openings to retain the wedge in the position to which it is set. Either before or after driving in the wedge, or in both instances, the nut on the reinforcing bolt may be tightened as much as necessary to secure the bolt in a rigid position. The drawing cable is then slackened and released to be used in setting up the succeeding series of guy lines in the same manner. In taking down the line, the wedge pin and wedge are quickly knocked out, the guy line immediately slackens and allows the device to be removed and the line to be taken down. It will thus be seen that such guy lines can be set up and taken down with great speed and efficiency by the use of my device. It tends to save capital in other equipment now used and which can be discarded. Above all it tends to save a large amount of labor time which is particularly expensive in logging operations because of a class of peculiarly skilled labor required in the same to carry on. Heretofore, when heavy guy lines of this kind have been taken down, as soon as the slackening approaches release of the free end it is suddenly loosed and violently swept from the guy stump in varying and unforeseen directions. It is then a source of danger and serious injury to operators compelled to be nearby. In my device, the release of the line can be controlled by driving the wedge out gradually, the clutch plates then acting as friction brakes, causing the line to slacken slowly until it can be dropped easily without flying about in a dangerous manner. This protection of human life is a highly important feature of the device.

I claim:

1. In a guy line clamping device, the combination of, a gripping member of convenient length having its sides folded, with opposing interior, longitudinal channels tapering from one end to the opposite end, the edges of said sides being spaced conveniently apart to allow the introduction between them of opposing parts of a guy line of common type and reception of same in the said channels in slidable position, and reinforcing means on the exterior surfaces of the folded parts arranged to prevent them from spreading.

2. In a guy line clamping device, the combination of illustrated elements as follows; a gripping member having its sides folded, the edges thereof spaced conveniently apart, its inner grooved surfaces tapering longitudinally and being adapted to receive parts of a guy line of common type thereon, and clutching plates having angled lugs at each end adapted to engage the ends of the member and the plate edges to engage a guy line of common type between them and the inner surfaces of the member.

3. In a guy line clamping device, the combination of illustrated elements as follows; a gripping member having its sides folded, the edges thereof spaced conveniently apart, its inner grooved surfaces tapering longitudinally and being adapted to receive parts of a guy line of common type thereon, and clutching plates having one edge helically formed, and having angled lugs at each end adapted to engage the ends of the member and the helical plate edges to engage a guy line of common type between them and the inner surfaces of the member.

4. In a guy line clamping device, the combination of illustrated elements as follows; a gripping member having its sides folded, the edges thereof spaced conveniently apart, its inner grooved surfaces tapering longitudinally and being adapted to receive parts of a guy line of common type thereon, also having a series of openings aligned along its central portion conveniently spaced apart from each other, clutching plates having angled lugs at each end adapted to engage ends of the member and the plate edges to engage a guy line of common type between them and the inner surfaces of the member, a locking wedge having one or more openings therein arranged to register with those in the member, the wedge being adapted to be driven between and into engagement with the clutching plates, and a fastening pin adapted to be inserted in registering openings in the member and wedge.

5. In a guy line clamping device, the combination of illustrated elements as follows; a gripping member having its sides folded, the edges thereof spaced conveniently apart, its inner grooved surfaces tapering longitudinally and being adapted to receive parts of a guy line of common type thereon, also having a series of openings aligned along its central portion conveniently spaced apart from each other, clutching plates having one edge helically formed and having angled lugs at each end adapted to engage the ends of the member and the helical plate edges to engage a guy line of common type between them and the inner surfaces of the member, a locking wedge having one or more openings therein arranged to register with those in the member, the wedge being adapted to be driven between and into engagement with the clutching plates, and a fastening pin adapted to be inserted in registering openings in the member and wedge.

6. In a guy line clamping device, the combination of illustrated elements as follows; a gripping member having its sides folded, the edges thereof spaced conveniently apart, its inner grooved surfaces tapering longitudinally and being adapted to receive parts of a guy line of common type thereon, also having a series of openings aligned along its central portion conveniently spaced apart from each other, clutching plates having one edge helically formed and having angled lugs at each end adapted to engage the ends of the member and the helical plate edges to engage a guy line of common type between them and the inner surfaces of the member, a locking wedge having one or more openings therein arranged to register with those in the member, the wedge being adapted to be driven between and into engagement with the clutching plates, a fastening pin adapted to be inserted in registering openings in the member and wedge, and reinforcing means on the exterior surfaces of the folded parts of the member, adapted to secure them from spreading.

7. In a guy line clamping device, the combination of illustrated elements as follows; a pair of clutching plates, each having one edge helically formed and each adapted to engage a guy line of common type when the same is positioned between the helical edges and an opposing tapering surface, and a locking wedge adapted to be driven between the opposite edges of said plates in sliding engagement until the plates are pressed apart to a pre-determined setting position.

8. In a guy line clamping device, the combination of illustrated elements as follows; a pair of clutching plates, each having one edge helically formed and each adapted to engage a guy line of common type when the same is positioned between the helical edges and an opposing tapering surface, a locking wedge adapted to be driven between the opposite edges of said plates in sliding engagement until the plates are pressed apart to a predetermined setting position, and means to secure the wedge rigidly in such position.

MAXWELL A. WEST.